US007350499B2

(12) United States Patent
Takaoka et al.

(10) Patent No.: US 7,350,499 B2
(45) Date of Patent: Apr. 1, 2008

(54) CONTROL DEVICE OF CYLINDER REDUCING OPERATION OF MULTI-CYLINDER ENGINE

(75) Inventors: Toshifumi Takaoka, Susono (JP); Tadashi Akiyama, Susono (JP); Takashi Suzuki, Gotenba (JP); Toshio Inoue, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 10/573,788

(22) PCT Filed: Nov. 5, 2004

(86) PCT No.: PCT/JP2004/016793

§ 371 (c)(1),
(2), (4) Date: Mar. 28, 2006

(87) PCT Pub. No.: WO2005/045217

PCT Pub. Date: May 19, 2005

(65) Prior Publication Data
US 2007/0042861 A1     Feb. 22, 2007

(30) Foreign Application Priority Data
Nov. 7, 2003    (JP)    ............................. 2003-378036

(51) Int. Cl.
*F02D 13/06* (2006.01)

(52) U.S. Cl. .................................. 123/198 F

(58) Field of Classification Search ............. 123/198 F
See application file for complete search history.

(56) References Cited

U.S. PATENT DOCUMENTS

| | | | |
|---|---|---|---|
| 5,481,461 A | 1/1996 | Miyamoto et al. | |
| 5,496,229 A | 3/1996 | Miyamoto | |
| 5,884,603 A | 3/1999 | Matsuki | |
| 6,244,242 B1 | 6/2001 | Grizzle et al. | |
| 6,651,619 B2 * | 11/2003 | Ogiso | ...................... 123/90.15 |
| 2001/0013330 A1 | 8/2001 | Grizzle et al. | |
| 2002/0162540 A1 | 11/2002 | Matthews et al. | |

FOREIGN PATENT DOCUMENTS

| | | |
|---|---|---|
| DE | 33 34 720 A1 | 4/1985 |
| DE | 196 04 737 A1 | 8/1997 |
| JP | A 05-272367 | 10/1993 |
| JP | A 05-332172 | 12/1993 |
| JP | A 06-193478 | 7/1994 |
| JP | A 07-180575 | 7/1995 |
| JP | A 10-103097 | 4/1998 |
| JP | A 10-103124 | 4/1998 |
| JP | A 11-182275 | 7/1999 |
| JP | A 11-350995 | 12/1999 |
| JP | A 2000-92613 | 3/2000 |
| JP | A 2001-164960 | 6/2001 |

* cited by examiner

*Primary Examiner*—Noah P. Kamen
(74) *Attorney, Agent, or Firm*—Oliff & Berridge, PLC

(57) ABSTRACT

A control device for cylinder reducing operation of a multi-cylinder engine for a vehicle controls the number of working cylinders in the engine more appropriately for fuel economy while ensuring the operational stability of the engine and comfortable drivability of the vehicle. The control device comprises a detector detecting engine output torque and judges if cylinder reducing operation is to be executed while referring to the engine output torque. Because of the detection of engine output torque, cylinder reducing operation will be executed as long as torque requested of the engine is available from the reduced number of working cylinders, thereby ensuring the generation of torque required in operating the engine while saving fuel as much as possible. Through a learning process, criteria for the judgment of execution of cylinder reducing operation are modified to be adapted for any variation of engine output performances.

6 Claims, 3 Drawing Sheets

CONTROL DEVICE OF CYLINDER REDUCING OPERATION OF MULTI-CYLINDER ENGINE

BACKGROUND OF THE INVENTION

1. Field of the Invention

The present invention relates to a control system for a multi-cylinder internal combustion engine, and more specifically, to a system for controlling the number of working (active) cylinders in a multi-cylinder engine and its operation.

2. Description of Prior Art

For improvement of fuel economy in multi-cylinder internal combustion engines for vehicles such as automobile, there has been proposed a strategy for controlling the number of working cylinders in an engine, depending upon a load applied thereon. A multi-cylinder engine has higher energy efficiency (the ratio of outputted mechanical energy to inputted fuel energy) when a load per cylinder is high. Thus, in this strategy, some of cylinders, e.g. a half number of cylinders, in an engine are selectively rendered inactive and a load per working cylinder is increased when the total load on the engine is low. This operation of a multi-cylinder engine while reducing the number of active cylinders is often called "cylinder reducing operation" or "partial operation". Several examples of devices and methods executing cylinder reducing operation control for a multi-cylinder engine are seen in Japanese Patent Laid-Open Publications 05-272367, 7-180575, 11-182275, 11-350995, 5-332172, 6-193478, 10-103097, etc.

In cylinder reducing operation control as described in those publications, a total load on an engine is monitored through engine revolution speed and an accelerator or throttle opening or intake air pressure. Based upon a map of these parameters, the operation mode of an engine is switched between full cylinder operation, where all cylinders are active, and reduced cylinder operation, where only a half of cylinders are active and the rest of cylinders are inactive. Upon the switching of the operation mode, i.e. the changing of the number of working cylinders, a positive or negative surge of torque or power outputted from an engine occurs due to the variation of the mass of motion of an engine before and after the switching of the operation modes and the retardation of response of intake air flow amount variation. Such an output torque or power surge would cause a mechanical shock or impact on a driving system around an engine and a vehicle body, deteriorating the stability of the driving system and the drivability and driving stability of a vehicle. Thus, several strategies for avoiding a torque or output power surge upon the switching of the operation mode have been proposed also.

For instance, JP 5-332172, 6-193478 and 10-103097 disclose that ignition timing and throttle opening are varied for suppressing torque variation upon the switching of the operation mode. JP 5-272367 and 7-180575 each show that a map of engine revolution speed and an intake air pressure for determining an operation mode to be executed is modified depending upon a gear ratio of a transmission. JP 11-182275 and 11-350995 disclose a hybrid engine and dynamotor system where toque difference outputted from the engine before and after the changing of the number of active cylinders is cancelled through the operation of dynamotors.

Since the cylinder reducing operation control is employed mainly for increasing fuel efficiency of an engine, the engine should be operated in the reduced cylinder mode as long as torque or power requested of the engine, e.g. for driving a vehicle, can be generated by a reduced number of working cylinders. Ideally, the operation mode should be switched when the output power of an engine is at the maximum level available in the reduced cylinder mode. Then, each working cylinder will be operated at high load even when a total engine load is low.

Actual output torque or power from an engine, however, depends upon not only an intake air amount or throttle opening but also an engine temperature, environmental conditions of the engine, such as atmospheric pressure. It is difficult or cumbersome to estimate engine output torque/power precisely from an intake air amount, etc. Thus, when the operation mode at a certain condition is determined based upon only parameters such as throttle opening used so far, the switching of the operation mode will not always be executed at an ideal condition for providing output power requested in operating the engine while saving fuel. For instance, the premature switching of the operation mode into the reduced cylinder mode (and delayed switching into the full cylinder mode) would cause unexpected shortage of torque/power. On the other hand, when the switching into the reduced cylinder is too late, fuel would be wasted.

Accordingly, for further improvement of output performance and fuel economy of an engine, it will be preferable to provide a control strategy for cylinder reducing operation, enabling the switching of the operation mode at a more appropriate timing than ever, irrespective of the variation of internal and external (environmental) conditions of an engine.

SUMMARY OF INVENTION

According to the present invention, there is provided a novel control device of cylinder reducing operation for a multi-cylinder engine, controlling an operation mode of the engine more appropriately for fuel economy while ensuring the operational stability of the engine and comfortable drivability of a vehicle.

The inventive control device for cylinder reducing operation selectively inactivating some cylinders of a multi-cylinder internal combustion engine comprises a detector detecting engine output torque and judges if cylinder reducing operation is to be executed while referring to the engine output torque detected with the detector.

As described above, engine output torque or power varies with a plurality of parameters of external and internal conditions of the engine. Thus, the judgment of an operation mode between full cylinder and reduced cylinder operations based upon a map employing an intake air amount or a throttle opening as in the conventional control devices is often inappropriate: the switching is not always executed at a power level to be executed in the reduced cylinder mode.

In the present invention, however, since engine output torque is directly monitored, the judgment of the switching of an operation mode can be done when an actually generated output power level reaches to the level to be executed in the reduced cylinder mode or the normal mode (around the maximum level available in the reduced cylinder mode), thereby ensuring the generation of torque/power requested in operating an engine while saving fuel. In other words, the switching of an operation mode into the reduced cylinder mode will be done without unexpected lack of torque/power while saving fuel as much as possible, irrespective of the variation of the conditional and/or environmental parameters of the engine. Especially for a hybrid driving system having an internal combustion engine and dynamotors, where a target value of torque or power to be generated is determined with an input device, e.g. an accelerator pedal of a driver, the direct monitoring of the output torque solely from the engine makes it easy to adjust the total output power (from the engine plus dynamotors) to the target level.

In the inventive device, when an output shaft of a multi-cylinder engine is operationally linked to a dynamotor e.g. through a planetary gear, a dynamotor may be useful as the detector detecting engine output torque. In a hybrid driving system where the output shaft of an internal combustion engine is operationally linked to an electric motor and an electric generator and wheels of a vehicle are driven with a shaft of the planetary gear linked to the motor, the torque detector will be the electric generator. In this case, the engine output torque can be detected precisely from reaction torque on the generator during driving the wheels. In this regard, as noted, upon the switching of an operation mode, an abrupt variation or a surge in torque is generated due to the variation of the mass of motion of an engine accompanied by the transient variation of engine revolution. In order to avoid transient variation of torque and revolution, the output torque may be modified for following its target value, e.g. by operating the electric motor or generator. The direct monitoring of the actual output torque makes the torque modification much easier.

By the way, the output performance of an engine varies with difference within tolerance in manufacturing an engine, abrasion in parts due to use of an engine, etc. Accordingly, individual engines have different maximum power available per cylinder, supplied with a certain fuel amount at wide opened throttle, and thus different ideal conditions for the switching of an operation mode. The maximum power available per cylinder in each engine also varies with environmental conditions, e.g. on a highland. Thus, the judgment criteria in determining an operation mode may be modified appropriately for individual engines through a learning process. In one embodiment of the present invention, when an engine is operated in the reduced cylinder mode, output torque at a certain engine revolution and at a predetermined upper limit of throttle angle is, preferably automatically, set to the upper limit of engine output torque at the certain engine revolution in the reduced cylinder mode.

With respect to the way of the judgment of an operation mode, since maximum available torque generated by each cylinder is dependent upon engine revolution, the judgment of the operation mode based upon actually outputted torque from the engine may be performed by using a two-dimensional map of engine revolution and engine torque, which map is divided into full cylinder operation (normal operation) region and reduced cylinder operation region. An operation mode to be executed may be judged according to which region a current engine operating condition defined with torque and revolution is fallen into. Then, it is allowed to execute the reduced cylinder operation mode to the full extent while ensuring the generation of output torque requested of the engine, and thereby improving fuel economy while suppressing the emission of exhaust gas. In this regard, as noted, maximum available torque/power per cylinder also varies with internal and external conditions of an engine, such as atmospheric pressure and temperature. Thus, the map for determining the operation mode may be modified appropriately in conjunction with the environmental conditions of the engine. The map may be modified through a learning process as described above.

Thus, it is an object of the present invention to provide new and novel control devices for cylinder reducing operation for a multi-cylinder engine, enabling the switching of an operation mode at a more appropriate timing than ever, and thereby allowing reduced cylinder operation to the full extent while ensuring the generation of required output torque and improving fuel economy.

It is another object of the present invention to provide such devices directly monitoring the output torque from an engine, and thereby avoiding unexpected shortage of output torque/power upon the switching of the operation mode due to the variation of environmental conditions of the engine.

It is a further object of the present invention to provide such devices wherein, through monitoring actual output torque from an engine, the transient variation of torque or power is modified for preventing any mechanical shock on an engine system or a vehicle body equipped therewith.

It is a further object of the present invention to provide such devices in which criteria for judging an operation mode of an engine are modified through a learning process in order to execute the switching of the operation mode appropriately for individual engines.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1:
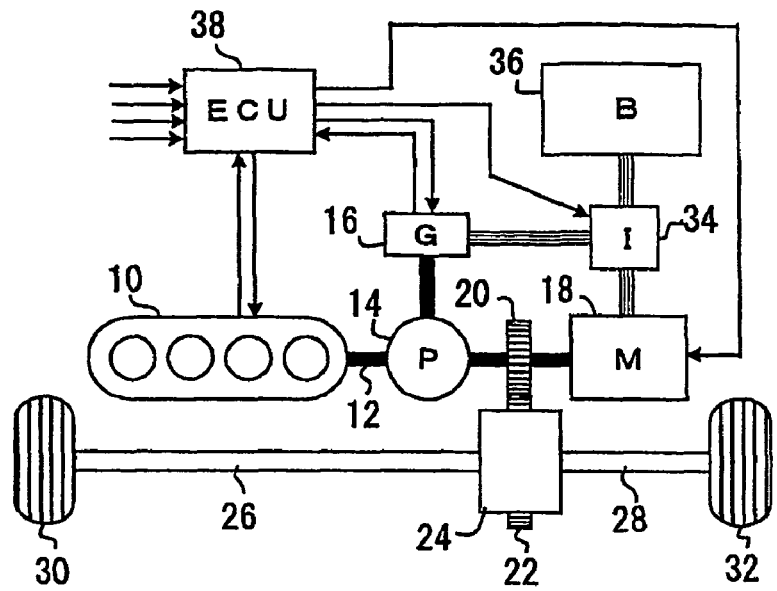
FIG. 1 is a diagram of a hybrid driving system for a vehicle incorporating a multi-cylinder engine and a control device for cylinder reducing operation of one embodiment according to the present invention.

FIG. 1 shows a diagram of a hybrid driving system for a vehicle, having a multi-cylinder internal combustion engine 10 and dynamotors 16 and 18, cooperating to generate power appropriately determined under the control of Electronic Control Unit (ECU) 38. A control device for cylinder reducing operation of a preferred embodiment according to the present invention is implemented in Electronic Control Unit (ECU) 38 by installing appropriate software.

In the illustrated system, an output shaft (crank shaft) 12 of the engine 10 is linked to one of three rotational elements of a planetary gear 14, and the other two rotational elements of the planetary gear each are linked to an electric generator (dynamotor G) 16 and an electrical motor (dynamotor M) 18, respectively. A gear 20, mounted on the linkage between the planetary gear 14 and motor 18, engages a gear 22, through which the rotation from the planetary gear 14 (the crankshaft 12) and motor 18 is transmitted to a differential gear 24 and wheel axles 26 and 28 driving a pair of wheels 30, 32. The generator 16, driven with the engine 10 via the planetary gear, charges a battery 36 through an inverter 34, and the motor 18 is driven with electric current supplied from the battery 36 through the inverter 34.

ECU 38, which may incorporate a computer which may be of an ordinary type including a central processor unit, a read only memory, a random access memory, input and output port means and a common bus interconnecting these elements, electronically controls the operation of the engine 10, generator 16, motor 18 and inverter 34 in accordance with software. ECU 38, typically receiving signals indicating engine operating conditions and external (environmental) conditions of the engine and vehicle from appropriate sensors, determines a target value of torque/power to be generated in the driving system and operates portions to be controlled in the system such as a throttle valve, in order to bring actual torque/power into conformity with the target value. In the cylinder reducing operation control, the number of working cylinders is controlled by rendering a half number of the cylinders inactive selectively in the manner as described below.

Figure 2:
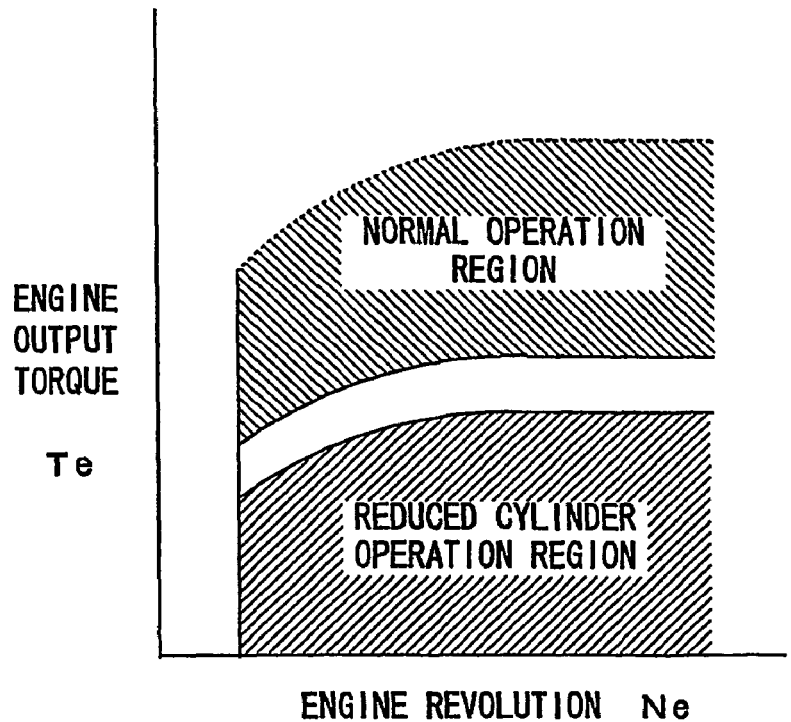
FIG. 2 shows a map of engine output torque Te and revolution Ne, defining a normal (full cylinder) operation region and a reduced cylinder operation region according to the present invention.

In operation, ECU 38 first judges an operation mode of the engine with a two-dimensional map of engine output torque Te and engine revolution Ne, as shown in FIG. 2, stored elsewhere in ECU. The output torque from the engine, used for the judgment of the operation mode of the engine, may be obtained from a signal indicating reaction force or torque in the generator 16 against the engine torque during driving the wheels. As seen from FIG. 2, the map includes a region of a normal operation mode and a region of a reduced cylinder operation mode. When an engine condition defined with output torque Te and revolution Ne is fallen into the normal operation region, the engine is to be operated in the normal operation mode where all of cylinders are operated. If, however, a condition defined with output torque Te and revolution Ne is fallen into the reduced cylinder operation region, the engine is to be operated in the reduced cylinder mode.

For the purpose of improvement of fuel economy, the reduced cylinder operation region should be set out such that the reduced cylinder operation is to be executed as long as the generation of the target torque or power is accomplished by the reduced number of working cylinders. This is because energy efficiency of an engine is high when the load per cylinder is high as described above. Thus, preferably, the upper limit of torque in the reduced cylinder region will be set to a substantial maximum torque available solely with working cylinders in the reduced cylinder mode (a half number of cylinders in the engine). Between the normal and reduced cylinder operation regions, a neutral zone ("hysteresis zone") where no switching of the operation mode is executed is provided for avoiding control hunting upon the mode switching.

The map of torque vs. revolution as shown in FIG. 2 is set out during manufacturing the engine on the assumption that the engine is operated under a standard condition. The output performance of the engine, however, is dependent upon its environmental conditions and individual engines have different output characteristics within tolerance, abrasion due to use, etc. Thus, the map of torque vs. revolution as shown in FIG. 2 may be appropriately modified. One of the ways of the map modification is through a learning process, which will be described below in more detail.

Upon the switching of the operation mode, the engine output torque or power varies transiently due to the variation of revolution induced from the inertial mass change of the engine and the retardation of response of intake airflow. In the present invention, however, since actual torque outputted solely from the engine 10 is monitored as described above, transient torque or power variation upon the mode switching can easily be compensated under the control of ECU 38 by using a dynamotor, and thereby undesirable mechanical impact on the driving system can be effectively suppressed.

Figure 3:
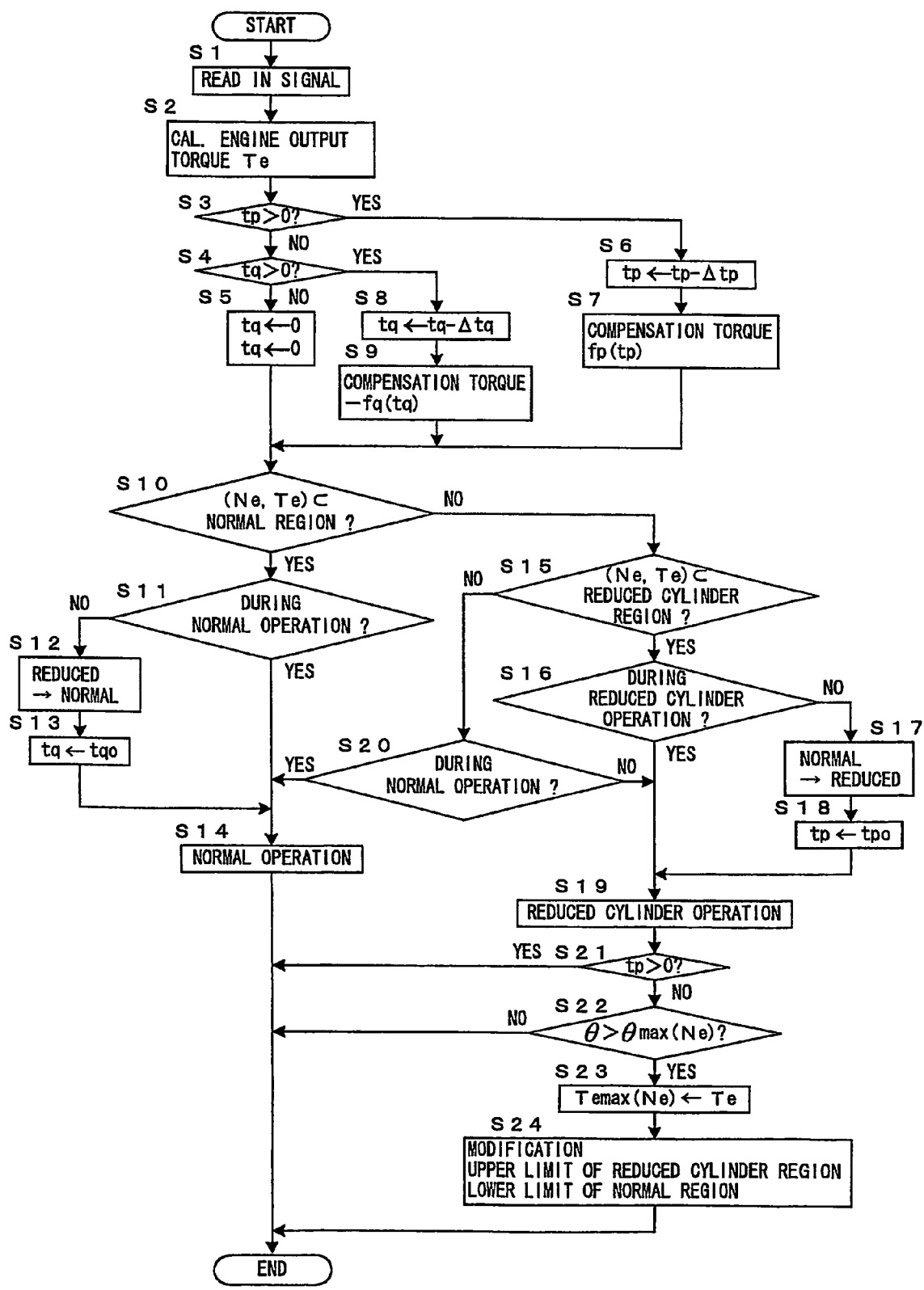
FIG. 3 is a flowchart showing cylinder reducing operation control routine executed in the preferred embodiment in the vehicles in FIG. 1 according to the present invention.

In the followings, the operation of the inventive control device is explained about with an exemplary flowchart as shown in FIG. 3.

The control according to the flowchart may be started by a closure of an ignition switch (not shown in FIG. 1) and cyclically repeated at a cycle time of millisecond order during the operation of the vehicle.

In step S1, the signals, required for the following process from sensors provided elsewhere in the driving system, including the signal of engine revolution Ne and the signal of reaction torque in the generator 16, i.e. torque applied from the engine 10 onto the rotational element in the planetary gear 14 linked to the generator 16, are read in. Then, in step S2, actual output torque Te solely from the engine 10 is determined based upon the torque signal from the generator.

Then, through steps S3-S9, compensation of transient variation of torque after the switching of the operation mode is executed. The detailed explanation of these steps will be described later.

In steps S10-19, by using the map of actual output torque Te vs. engine revolution Ne in FIG. 2, the operation mode is judged to either of the normal operation and reduced cylinder operation modes. Firstly, in step S10, it is judged if a condition defined with Te and Ne is fallen into the normal operation region. If so, it is judged if the engine is operated in the normal mode (step S11). If so, the normal mode is maintained (S14). If the engine is operated in the reduced cylinder mode, the operation mode is switched into the normal mode (step S12) and a first timer of transient term tq, which will be used in the torque compensation in steps S3-S9 in the subsequent cycles, is set to its initial value tq0.

If a condition of Te and Ne is fallen into in the reduced cylinder region, the process goes through steps S15 and, in step S16, it is judged if the engine is operated in the reduced cylinder mode. If so, the reduced cylinder operation is maintained (S19). If, however, the normal operation is executed, the mode is switched into the reduced cylinder mode in step S17 and a second timer of transient term tp is set to its initial value tp0.

If the condition is fallen into the hysterisis zone, the process reaches to step S20 via step S15, and it is judged if the engine is operated in the normal mode. If so, the normal operation is maintained (step S14), and otherwise, the reduced cylinder operation is maintained (step S19). Accordingly, when a current condition is within the hysterisis zone, no switching of the operation mode is executed, and thus control hunting upon the switching is prevented.

Returning to steps S3-S9, in order to avoid a mechanical impact due to torque variation upon the changing of the number of working cylinders, the transient torque compensation routine is executed after the switching of the operation mode.

Referring to FIG. 4(A), when the engine operation is switched from the normal into the reduced cylinder mode (at t1) in response to the reduction of the output torque (demanded by ECU 38 through the closure of throttle opening), the output torque from the engine is excessively reduced as indicated in the bold line in the lower graph in FIG. 4(A) because of the reduction of the number of working cylinders. This is because, although the throttle opening of the engine is increased in response to the mode switching as shown in the upper graph in FIG. 4(A) for recovering the required torque, the response of the output torque is delayed due to the variation of the inertial mass of the rotation and the retardation of intake airflow. Thus, in order to compensate for transient, excessive reduction or shortage in the output torque after the mode switching, the additional torque generated with the motor 18 is added into the output torque, and thereby smoothly connecting the output torque before and after the mode switching as indicated by a thin line in FIG. 4(A).

Figure 4:
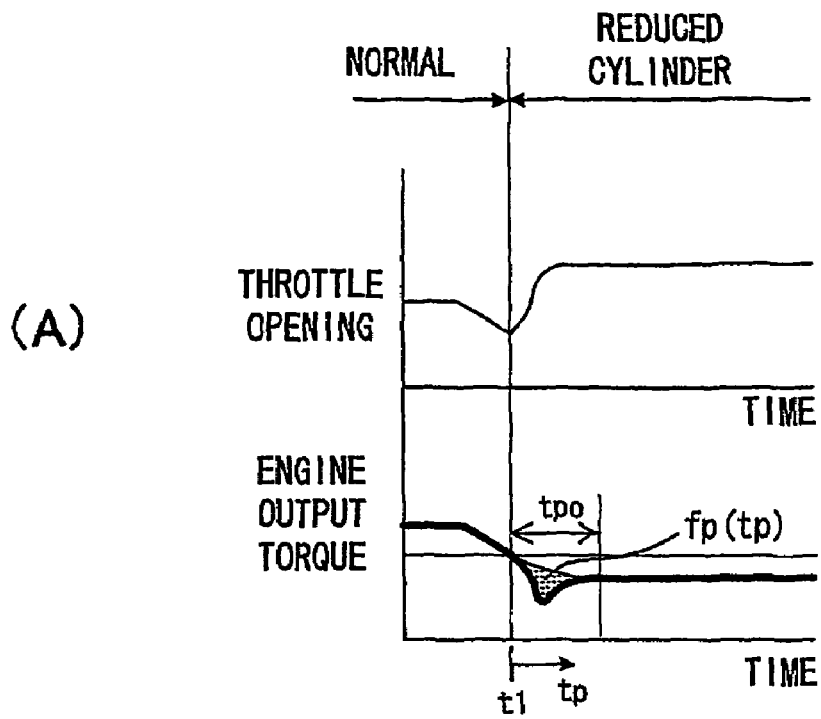
FIG. 4 shows diagrams of time variations of throttle valve opening and engine output torque during the switching from the normal mode to the reduced cylinder mode (A) and from the reduced cylinder mode to the normal mode (B).
Figure 4:
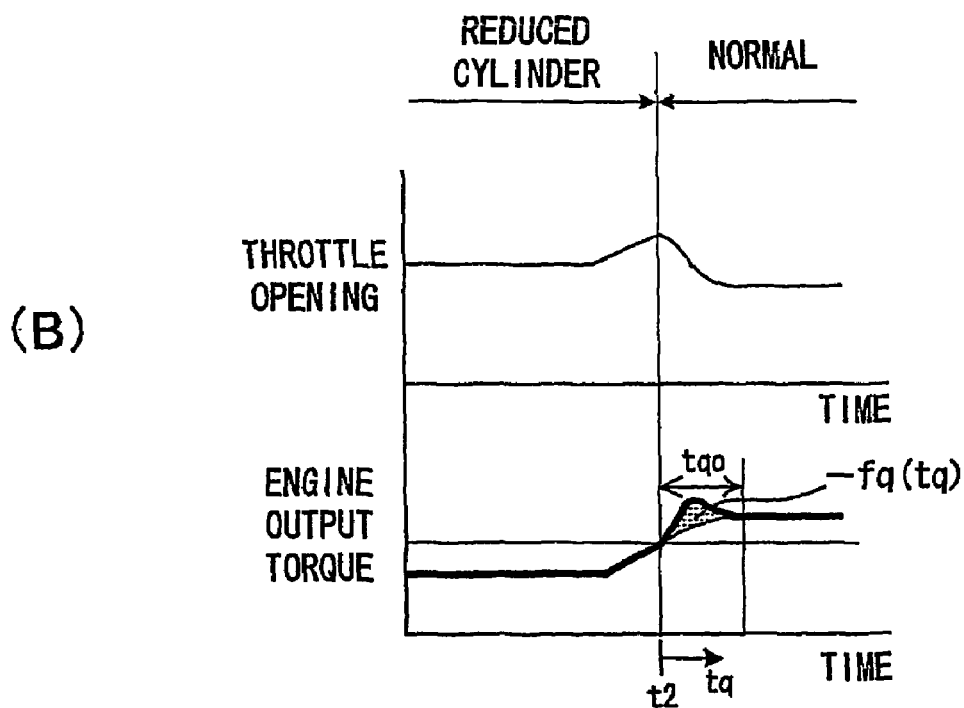

Similarly, referring to FIG. 4(13), when the engine operation is switched from the reduced cylinder mode into the normal mode in response to the increase of the output torque, the output torque from the engine is excessively increased, as indicated in the bold line in the lower graph in FIG. 4(B), because of the increase of the number of working cylinders. In this case, the excessively increased torque or transient surplus torque is absorbed with the generator 16 and thereby the output torque from the driving system varies smoothly before and after the mode switching as indicated by a thin line in FIG. 4(B).

For the above-mentioned torque compensation, the first and second timers tq, tp, each value of which is reduced to zero during cycling the routine, are employed for judging if the state of the engine is in a transient phase after the mode switching. Once the mode switching is executed, the first or second timer tq, tp is set to tq0 or tp0, respectively, as described above (At the staring of the control, the first and second timers tq, tp is set to 0.). The amounts of tq0 and tp0 may be appropriately determined based upon engine parameters. Then, when the process returns to START, it is judged if tp or tq is larger than 0 in steps S3 or S4.

If tp >0(n step S3), indicating that the engine is in the transient phase after the switching from the normal mode into the reduced cylinder mode, the second timer tp is decremented by Δtp, a small amount corresponding to one cycle time of the routine, in step S6. Then, the shortage of driving torque outputted from the system is compensated by adding the amount calculated with fp(tp), a function of elapsed time (the timer value), to the output torque, as indicated by thin solid line in FIG. 4 (A) in step S7. The compensation for the output torque shortage is repeated during the subsequent cycles until the counter tp reaches to zero.

Similarly, if tq >0 (in step S4), indicating that the engine is in the transient phase after the switching from the reduced cylinder mode into the normal mode, the first counter tq is decremented by Δtq, a small amount corresponding to one cycle time of the routine, in step S8. Then, the surplus in torque is compensated by absorbing the amount calculated with −fq (tq) from the output torque as indicated by thin solid line in FIG. 4 (B) in step S9. The compensation for the output torque surplus is repeated during the subsequent cycles until the counter tq reaches to zero.

When both tp and tp is not larger than 0, these values are set to 0 in step S5.

As described above, the upper limit of torque or power available in the reduced cylinder operation can vary with internal and environmental conditions and the use of the engine. Thus, preferably, in order that the reduced cylinder operation is executed to the full extent, the upper limit of the reduced cylinder operation region in the map is modified automatically through a learning process. The routine for modifying the map may be incorporated in the routine of FIG. 3.

Referring to steps S21-S24, the learning modification of the map is executed when the engine is operated in the reduced cylinder mode. After step S19, it is judged in step S21 if tp is still larger than 0. If so, the operation of the engine is still in a transient phase. A transient phase, in which the output torque is not stable, is not suitable for the map modification. Thus, the process returns to Start without the map modification.

If the transient phase has ended (tp=0), it is judged in step S22 whether or not the current throttle opening or angle θ is equal to or exceeds a predetermined maximum allowable value θma (Ne) at the current revolution. If the throttle opening reaches to the maximum allowable level, 5 no further torque can be gained in the reduced cylinder operation. In other words, the output torque from the engine at the substantial full throttle opening is considered to be the upper limit of the reduced cylinder operation. Thus, when the maximum allowable throttle opening is detected, the current torque is set to the upper limit of the reduced cylinder operation region. In this regard, the maximum allowable throttle opening is dependent upon engine revolution so that θma is determined as a function of engine revolution.

In the flowchart, if θ>θma is detected, the current torque Te is stored as the upper limit of the reduced cylinder operation region at the current revolution, Temax(Ne) in step S23, and in step S24, the upper boundary of the reduced cylinder operation region is modified such that the boundary line passes through the point of Temax (Ne) newly stored in step S23. Together with the modification of the upper boundary of the reduced cylinder operation region, preferably, the lower boundary of the normal operation region is modified for keeping the width of hysteresis zone enough to avoid control hunting. Accordingly, the criteria of the judgment of an operation mode are adapted for the current output performance of the engine.

If θ>θma is not detected in step S22, the process returns to START without the map modification.

Although the present invention has been described in detail with respect to preferred embodiments thereof and some partial modifications thereof, it will be apparent for those skilled in the art that other various modifications are possible with respect to the shown embodiments within the scope of the present invention.

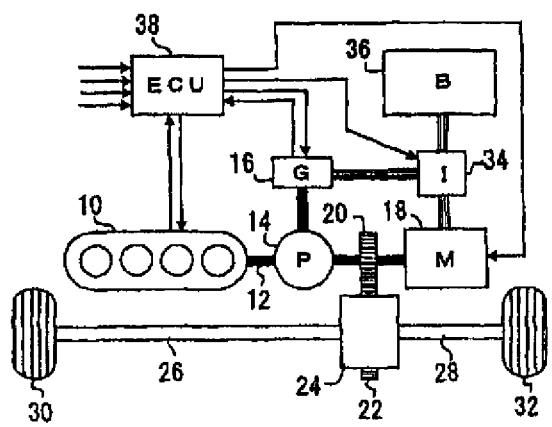

The invention claimed is:

1. A control device for cylinder reducing operation in which at least one of cylinders of a multi-cylinder internal combustion engine are selectively inactivated, comprising a detector detecting engine output torque and judging if the cylinder reducing operation is to be executed while referring to the engine output torque detected with the detector.

2. A device according to claim 1, wherein the judgment of the execution of the cylinder reducing operation based upon the engine output torque is performed by setting out a two-dimensional map of engine revolution and the engine output torque, which map is divided into a normal operation region and a reduced cylinder operation region; and judging which of the normal operation region and the reduced cylinder operation region an engine operation condition is fallen into.

3. A device according to claim 2, wherein the map is modified depending upon engine operating environments.

4. A device according to any one of claims 1, 2, 3, wherein criteria of the judgment of the execution of the cylinder reducing operation are modified through a learning process in which, when an engine is operated in the reduced cylinder mode, an output torque at a certain engine revolution and at a predetermined upper limit of throttle angle is set to the upper limit of engine output torque at the certain engine revolution for the judgment of the execution of the reduced cylinder operation.

5. A device according to any one of claims 1, 2, or 3, wherein an output shaft of the multi-cylinder engine is operationally linked to an electric motor and an electric generator through a planetary gear and an axle of the planetary gear linked to the motor drives wheels, and the detector detecting engine output torque is the generator.

6. A device according to claim 5, wherein a variation of the output torque from the engine due to a variation of an inertial mass of motion in the engine is compensated based upon the detection of the output torque.

* * * * *

UNITED STATES PATENT AND TRADEMARK OFFICE
CERTIFICATE OF CORRECTION

| | |
|---|---|
| PATENT NO. | : 7,350,499 B2 |
| APPLICATION NO. | : 10/573788 |
| DATED | : April 1, 2008 |
| INVENTOR(S) | : Toshifumi Takaoka et al. |

It is certified that error appears in the above-identified patent and that said Letters Patent is hereby corrected as shown below:

Replace claims 1-6 with the following claims 1-5:

1. A control device for cylinder reducing operation in which at least one of cylinders of a multi-cylinder internal combustion engine are selectively inactivated, comprising a detector detecting engine output torque and judging if the cylinder reducing operation is to be executed while referring to the engine output torque detected with the detector; wherein criteria of the judgment of the execution of the cylinder reducing operation are modified through a learning process in which, when an engine is operated in the reduced cylinder mode, an output torque at a certain engine revolution and at a predetermined upper limit of throttle angle is set to the upper limit of engine output torque at the certain engine revolution for the judgment of the execution of the reduced cylinder operation.

2. A device according to claim 1, wherein the judgment of the execution of the cylinder reducing operation based upon the engine output torque is performed by setting out a two-dimensional map of engine revolution and the engine output torque, which map is divided into a normal operation region and a reduced cylinder operation region; and judging which of the normal operation region and the reduced cylinder operation region an engine operation condition is fallen into.

3. A device according to claim 2, wherein the map is modified depending upon engine operating environments.

UNITED STATES PATENT AND TRADEMARK OFFICE
CERTIFICATE OF CORRECTION

PATENT NO. : 7,350,499 B2
APPLICATION NO. : 10/573788
DATED : April 1, 2008
INVENTOR(S) : Toshifumi Takaoka et al.

It is certified that error appears in the above-identified patent and that said Letters Patent is hereby corrected as shown below:

4. A device according to claim 1, wherein an output shaft of the multi-cylinder engine is operationally linked to an electric motor and an electric generator through a planetary gear and an axle of the planetary gear linked to the motor drives wheels, and the detector detecting engine output torque is the generator.

5. A device according to claim 4, wherein a variation of the output torque from the engine due to a variation of an inertial mass of motion in the engine is compensated based upon the detection of the output torque.

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,350,499 B2 |
| APPLICATION NO. | : 10/573788 |
| DATED | : April 1, 2008 |
| INVENTOR(S) | : Toshifumi Takaoka et al. |

It is certified that error appears in the above-identified patent and that said Letters Patent is hereby corrected as shown below:

Delete the title page and substitute therefor the attached title page.

Column 8, line 42 - column 10, line 4,
Replace claims 1-6 with the following claims 1-5:

1. A control device for cylinder reducing operation in which at least one of cylinders of a multi-cylinder internal combustion engine are selectively inactivated, comprising a detector detecting engine output torque and judging if the cylinder reducing operation is to be executed while referring to the engine output torque detected with the detector; wherein criteria of the judgment of the execution of the cylinder reducing operation are modified through a learning process in which, when an engine is operated in the reduced cylinder mode, an output torque at a certain engine revolution and at a predetermined upper limit of throttle angle is set to the upper limit of engine output torque at the certain engine revolution for the judgment of the execution of the reduced cylinder operation.

2. A device according to claim 1, wherein the judgment of the execution of the cylinder reducing operation based upon the engine output torque is performed by setting out a two-dimensional map of engine revolution and the engine output torque, which map is divided into a normal operation region and a reduced cylinder operation region; and judging which of the normal operation region and the reduced cylinder operation region an engine operation condition is fallen into.

3. A device according to claim 2, wherein the map is modified depending upon engine operating environments.

UNITED STATES PATENT AND TRADEMARK OFFICE
CERTIFICATE OF CORRECTION

PATENT NO. : 7,350,499 B2
APPLICATION NO. : 10/573788
DATED : April 1, 2008
INVENTOR(S) : Toshifumi Takaoka et al.

It is certified that error appears in the above-identified patent and that said Letters Patent is hereby corrected as shown below:

4. A device according to claim 1, wherein an output shaft of the multi-cylinder engine is operationally linked to an electric motor and an electric generator through a planetary gear and an axle of the planetary gear linked to the motor drives wheels, and the detector detecting engine output torque is the generator.

5. A device according to claim 4, wherein a variation of the output torque from the engine due to a variation of an inertial mass of motion in the engine is compensated based upon the detection of the output torque.

This certificate supersedes the Certificate of Correction issued March 10, 2009.

Signed and Sealed this

Thirty-first Day of March, 2009

JOHN DOLL
*Acting Director of the United States Patent and Trademark Office*

United States Patent
Takaoka et al.

(10) Patent No.: US 7,350,499 B2
(45) Date of Patent: Apr. 1, 2008

(54) CONTROL DEVICE OF CYLINDER REDUCING OPERATION OF MULTI-CYLINDER ENGINE

(75) Inventors: Toshifumi Takaoka, Susono (JP); Tadashi Akiyama, Susono (JP); Takashi Suzuki, Gotenba (JP); Toshio Inoue, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 10/573,788

(22) PCT Filed: Nov. 5, 2004

(86) PCT No.: PCT/JP2004/016793

§ 371 (c)(1),
(2), (4) Date: Mar. 28, 2006

(87) PCT Pub. No.: WO2005/045217

PCT Pub. Date: May 19, 2005

(65) Prior Publication Data

US 2007/0042861 A1 Feb. 22, 2007

(30) Foreign Application Priority Data

Nov. 7, 2003 (JP) ............... 2003-378036

(51) Int. Cl.
*F02D 13/06* (2006.01)
(52) U.S. Cl. .................................. 123/198 F
(58) Field of Classification Search ............ 123/198 F
See application file for complete search history.

(56) References Cited

U.S. PATENT DOCUMENTS

| | | | |
|---|---|---|---|
| 5,481,461 A | 1/1996 | Miyamoto et al. | |
| 5,496,229 A | 3/1996 | Miyamoto | |
| 5,884,603 A | 3/1999 | Matsuki | |
| 6,244,242 B1 | 6/2001 | Grizzle et al. | |
| 6,651,619 B2 * | 11/2003 | Ogiso | 123/90.15 |
| 2001/0013330 A1 | 8/2001 | Grizzle et al. | |
| 2002/0162540 A1 | 11/2002 | Matthews et al. | |

FOREIGN PATENT DOCUMENTS

| | | |
|---|---|---|
| DE | 33 34 720 A1 | 4/1985 |
| DE | 196 04 737 A1 | 8/1997 |
| JP | A 05-272367 | 10/1993 |
| JP | A 05-332172 | 12/1993 |
| JP | A 06-193478 | 7/1994 |
| JP | A 07-180575 | 7/1995 |
| JP | A 10-103097 | 4/1998 |
| JP | A 10-103124 | 4/1998 |
| JP | A 11-182275 | 7/1999 |
| JP | A 11-350995 | 12/1999 |
| JP | A 2000-92613 | 3/2000 |
| JP | A 2001-164960 | 6/2001 |

* cited by examiner

*Primary Examiner*—Noah P. Kamen
(74) *Attorney, Agent, or Firm*—Oliff & Berridge, PLC

(57) ABSTRACT

A control device for cylinder reducing operation of a multi-cylinder engine for a vehicle controls the number of working cylinders in the engine more appropriately for fuel economy while ensuring the operational stability of the engine and comfortable drivability of the vehicle. The control device comprises a detector detecting engine output torque and judges if cylinder reducing operation is to be executed while referring to the engine output torque. Because of the detection of engine output torque, cylinder reducing operation will be executed as long as torque requested of the engine is available from the reduced number of working cylinders, thereby ensuring the generation of torque required in operating the engine while saving fuel as much as possible. Through a learning process, criteria for the judgment of execution of cylinder reducing operation are modified to be adapted for any variation of engine output performances.

5 Claims, 3 Drawing Sheets